US007769493B2

(12) United States Patent
Elshafei et al.

(10) Patent No.: US 7,769,493 B2
(45) Date of Patent: Aug. 3, 2010

(54) SYSTEM AND METHOD FOR CONTROLLING FLOW CHARACTERISTICS

(75) Inventors: Moustafa Elshafei, Dhahran (SA); Ashraf Yousef Dasa, Dhahran (SA)

(73) Assignee: King Fahd University of Petroleum and Minerals (SA)

( * ) Notice: Subject to any disclaimer, the term of this patent is extended or adjusted under 35 U.S.C. 154(b) by 173 days.

(21) Appl. No.: 12/076,541

(22) Filed: Mar. 19, 2008

(65) Prior Publication Data

US 2009/0240376 A1 Sep. 24, 2009

(51) Int. Cl.
*G05D 7/00* (2006.01)
*B67B 7/00* (2006.01)
*F16K 17/34* (2006.01)
*G01L 27/00* (2006.01)

(52) U.S. Cl. .......................... 700/282; 137/486; 222/1; 702/98

(58) Field of Classification Search ................. 700/282; 702/98; 222/1; 137/486
See application file for complete search history.

(56) References Cited

U.S. PATENT DOCUMENTS

| | | | | |
|---|---|---|---|---|
| 3,486,334 A | * | 12/1969 | Miller | 60/450 |
| 4,166,437 A | * | 9/1979 | Bianchi et al. | 123/406.44 |
| 4,421,716 A | * | 12/1983 | Hench et al. | 376/216 |
| 4,556,956 A | * | 12/1985 | Dickenson et al. | 700/42 |
| 5,107,441 A | * | 4/1992 | Decker | 702/47 |
| 5,586,050 A | * | 12/1996 | Makel et al. | 702/51 |
| 6,039,304 A | | 3/2000 | Carlson et al. | |
| 6,286,412 B1 | * | 9/2001 | Manring et al. | 91/433 |
| 6,591,201 B1 | * | 7/2003 | Hyde | 702/45 |
| 6,661,112 B2 | | 12/2003 | Zeier et al. | |
| 6,678,584 B2 | | 1/2004 | Junk et al. | |
| 6,681,787 B2 | * | 1/2004 | Tinsley et al. | 137/10 |
| 6,779,541 B2 | | 8/2004 | Inayama et al. | |
| 6,795,780 B1 | * | 9/2004 | Hyde | 702/45 |
| 6,850,849 B1 | | 2/2005 | Roys | |
| 6,882,924 B2 | | 4/2005 | Miller | |
| 6,892,745 B2 | | 5/2005 | Benson | |
| 6,932,102 B2 | | 8/2005 | Dupuis | |
| 7,025,090 B2 | | 4/2006 | Bramley et al. | |
| 7,051,757 B2 | | 5/2006 | McMillan et al. | |
| 7,073,392 B2 | * | 7/2006 | Lull et al. | 73/861 |
| 7,096,744 B2 | | 8/2006 | Kielb et al. | |
| 7,111,643 B2 | | 9/2006 | Oh | |
| 7,156,115 B2 | | 1/2007 | Everett et al. | |
| 7,222,542 B2 | | 5/2007 | Eken et al. | |
| 7,478,012 B2 | * | 1/2009 | Tewes et al. | 702/183 |
| 7,617,813 B2 | * | 11/2009 | Pirkl et al. | 123/490 |

(Continued)

*Primary Examiner*—Albert DeCady
*Assistant Examiner*—Thomas H Stevens
(74) *Attorney, Agent, or Firm*—Richard C. Litman

(57) ABSTRACT

The system for controlling flow characteristics allows a user to selectively modify the inherent fluid flow characteristics of a fluid transmission system including a flow process controller and a control valve positioner. The system includes a programmable flow controller having an input adapted for receiving an input signal from the flow process controller. The programmable flow controller selectively modifies the input signals generated by the flow process controller depending upon user-selectable flow parameters. An output is in communication with the programmable flow controller, with the output being adapted for transmitting output signals to the control valve positioner (and the valve connected thereto). A user interface is provided for inputting the user-selectable flow parameters to the programmable flow controller for modification of the input signal to the user-selectable flow parameters.

7 Claims, 5 Drawing Sheets

U.S. PATENT DOCUMENTS

| | | | |
|---|---|---|---|
| 2001/0037670 A1* | 11/2001 | Boger et al. | 73/1.72 |
| 2003/0088338 A1* | 5/2003 | Phillips et al. | 700/282 |
| 2005/0274417 A1* | 12/2005 | Perry et al. | 137/487.5 |
| 2010/0070182 A1* | 3/2010 | Bieker et al. | 702/12 |

* cited by examiner

SYSTEM AND METHOD FOR CONTROLLING FLOW CHARACTERISTICS

BACKGROUND OF THE INVENTION

1. Field of the Invention

The present invention relates to devices for controlling the flow of a fluid through a conduit, and particularly to a system and method for controlling flow characteristics of a fluid through a valve.

2. Description of the Related Art

In many types of fluid systems, it is necessary to modulate or otherwise control a flow of fluid through a fluid circuit. For example, heating, ventilation and air conditioning (HVAC) systems for buildings typically include multiple fluid circuits providing heated or chilled refrigerant to heat exchangers for controlling the temperature within the building. The flow of fluid in the circuits is generally modulated by one or more valves in each fluid circuit, which are operatively connected to and controlled by a control device, such as a thermostat, to provide a flow of fluid to the heat exchangers, which will result in a desired temperature being maintained in inside the building.

As part of the process of selecting a control valve for use in a particular fluid system, the relationship between the effective flow area of the control valve relative to the degree of opening is known as the "valve characteristic." For valves used in HVAC systems, it is typically desirable to have a so-called "equal percentage" valve characteristic over a desired range of fluid flows. In a valve exhibiting equal percentage characteristics, a change in the degree of opening of the valve (as a percentage) with respect to a previous given degree of opening will result in an equal percentage change in fluid flow over the fluid flow at the previous given degree of opening. For example, if opening the valve by an additional 10% causes a corresponding 10% increase in fluid flow, the valve exhibits equal percentage characteristics. A valve with equal percentage flow characteristics increases fluid flow at a very low rate when the valve first begins to open. As the degree of opening becomes larger, the rate of increase in fluid flow for an incremental increase in opening becomes larger.

For more generalized systems, when a valve position is determined and controlled by the controller, which directly regulates the valve based upon a particular quantity, such as temperature, pressure, fluid level, etc., the valve flow characteristics appear in cascade with the process transfer function characteristics. Proper selection of the valve flow characteristic becomes necessary in order to cancel out effects of process nonlinearities for smooth regulation and control of the desired process variable. The primary function of the control valve is regulating the process variable, rather than regulation of the flow at a desired flow rate. Typical valve controllers are mechanical devices, either relying on manual resetting for particular characteristics, or with only a limited number of mechanical positions available. Such valve control devices do not allow for variation in valve characteristics, particularly for fluid flow systems in which the user needs to carefully and precisely control fluid flow.

None of the above inventions, taken either singly or in combination, is seen to describe the instant invention as claimed. Thus, a system and method for controlling flow characteristics solving the aforementioned problems is desired.

SUMMARY OF THE INVENTION

The system for controlling flow characteristics allows a user to selectively modify the inherent fluid flow characteristics of a fluid transmission system having a flow process controller and a control valve positioner. The system includes a device that may be a stand-alone device positioned between the flow process controller and the control valve positioner, or that may integrated into the fluid transmission system. The device includes a high performance microcontroller, programmable logic controller, control board having a microprocessor, or other processing system, and an input adapted for receiving an input signal from the flow process controller. The device's processing system may be connected to a process control computer by a high speed communication port. The microcontroller selectively modifies the input signals generated by the flow process controller depending upon user-selectable flow parameters.

The microcontroller produces output signals to the control valve positioner to control the position of the valve. A user interface is further provided for inputting the user-selectable flow parameters to the microcontroller for modification of the input signal to the user-selectable flow parameters. In use, the inherent fluid flow characteristics associated with the flow process controller and the valve associated with the control valve positioner are modified, depending upon the user-controlled input of the user-selectable flow parameters.

The user inputs a set of inherent valve parameters into the microcontroller, which then calculates a set of desired valve parameters from the user-selectable flow characteristics (or looks the parameters up from tables of precomputed parameters stored on the device). A correction factor is then calculated, depending upon the difference between the set of inherent valve parameters and the set of desired valve parameters. A control signal is then output, depending upon the correction factor, to the control valve positioner.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed towards a system and method for controlling flow characteristics for a valve in a piping system to control the flow of a fluid through the valve. The system includes a processing device 10, sometimes referred to herein as a programmable flow controller, positioned between a flow process controller (the input is indicated by directional arrow 23 in FIG. 3) and a valve positioner (the output signal is indicated by directional arrow 20 in FIG. 3). The valve positioner or control valve positioner, as used herein, is a device that can change the position of a valve (a gate valve, a globe valve, a ball valve, a poppet valve, etc.) in response to an electrical signal. The device 10 modifies, in a user-controllable manner, the manipulated variable going from a process controller to a flow control valve, and produces an alternative value to be delivered to the control valve positioner. This is performed so that the flow characteristics of the valve follow a desired curve irrespective of the actual inherent valve characteristics.

Figure 1:
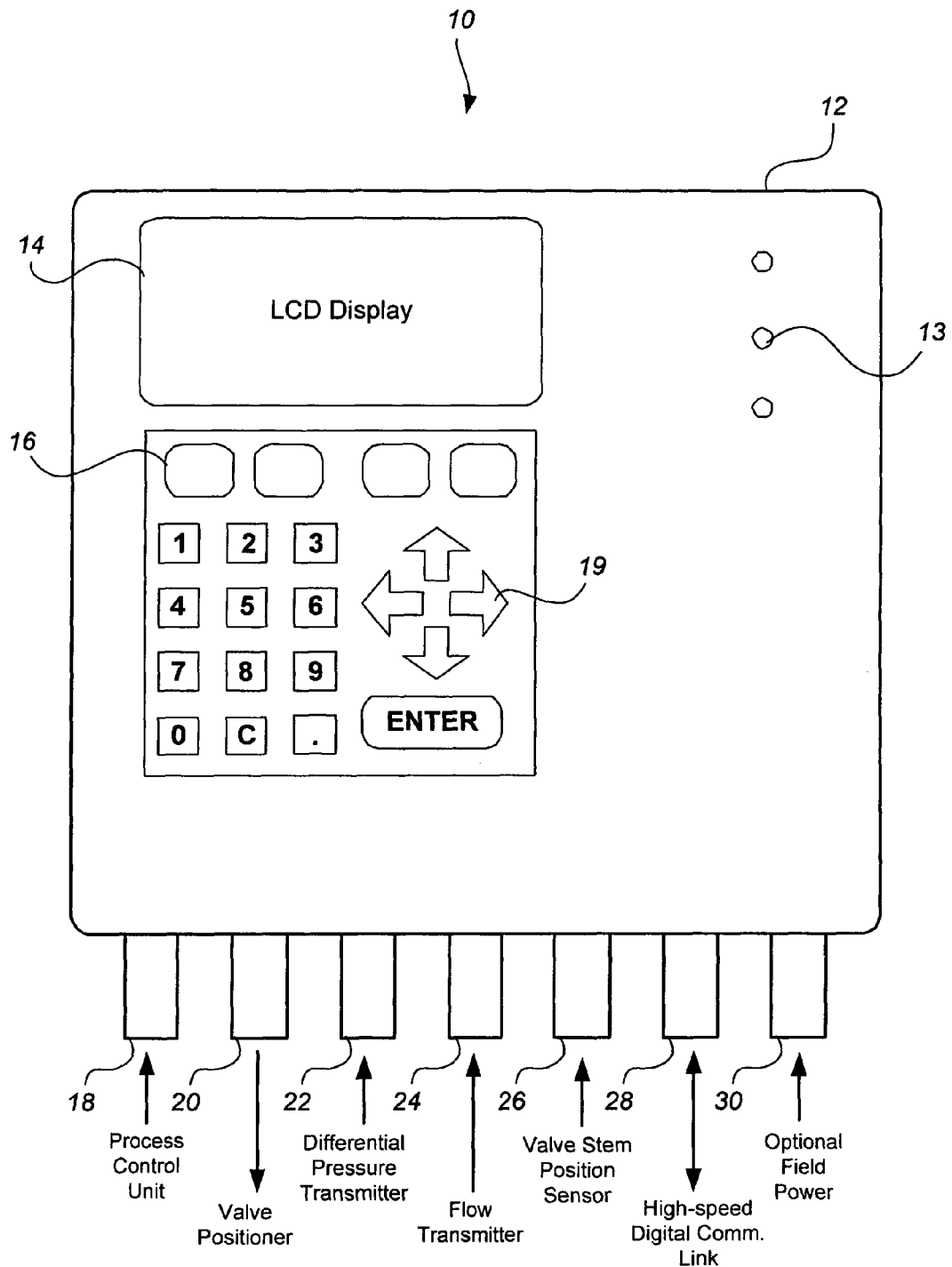
FIG. 1 is a front view of an exemplary processing device in a system for controlling flow characteristics according to the present invention.

Device 10 may be mounted as a stand-alone unit in the field near the valve positioner, integrated with the valve positioner assembly, or integrated with a process control system. FIG. 1 illustrates an exemplary device 10, which includes an external user interface and processing components located within a housing 12. As shown, a liquid crystal display (LCD) 14 (or any other suitable display) is mounted in the housing 12, along with a user input device, such as buttons or a keyboard 16. The keyboard 16 preferably includes a standard numeric keypad for entering numeric values, and four directional keys 19 for display menu selection, along with user-definable function keys. Additional output indicators, such as light emitting diodes or the like, are indicated at 13. It should be understood that keys 16, 18 and visual indicators 13, 14 are shown for exemplary purposes only, and that any desired user interface, including any combination of buttons, switches or the like, and any suitable type of visual or display indicators may be used.

The input connection or terminal 18 preferably receives a signal from the process controller, which is preferably in the range of approximately 4 to 20 mA. Similarly, the output connection or terminal 20 transmits a modified control signal to the valve positioner, also preferably in the approximately 4 to 20 mA range. The device may also include one or more of the following input terminals: a differential pressure transmitter terminal 22 for receiving an approximately 4 to 20 mA signal from a differential pressure transducer, with the signal strength being proportional to the difference of pressure across the valve; a terminal 24 for receiving a signal from a flow transmitter; and a valve stem position sensor terminal 26 for receiving a signal from a valve stem position sensor 26. The device 10 may have other input terminals for receiving other control signals or sensor signals from transducers, such as a process value transmitter, a fluid temperature transmitter, an upstream pressure transmitter, and/or a downstream pressure transmitter. The device 10 may also be connected via one or more high speed digital communication link terminals 28 to a host process control computer 60. Terminal 30 may be provided for optional connection to a field power source, or the device 10 may be battery operated.

Figure 3:
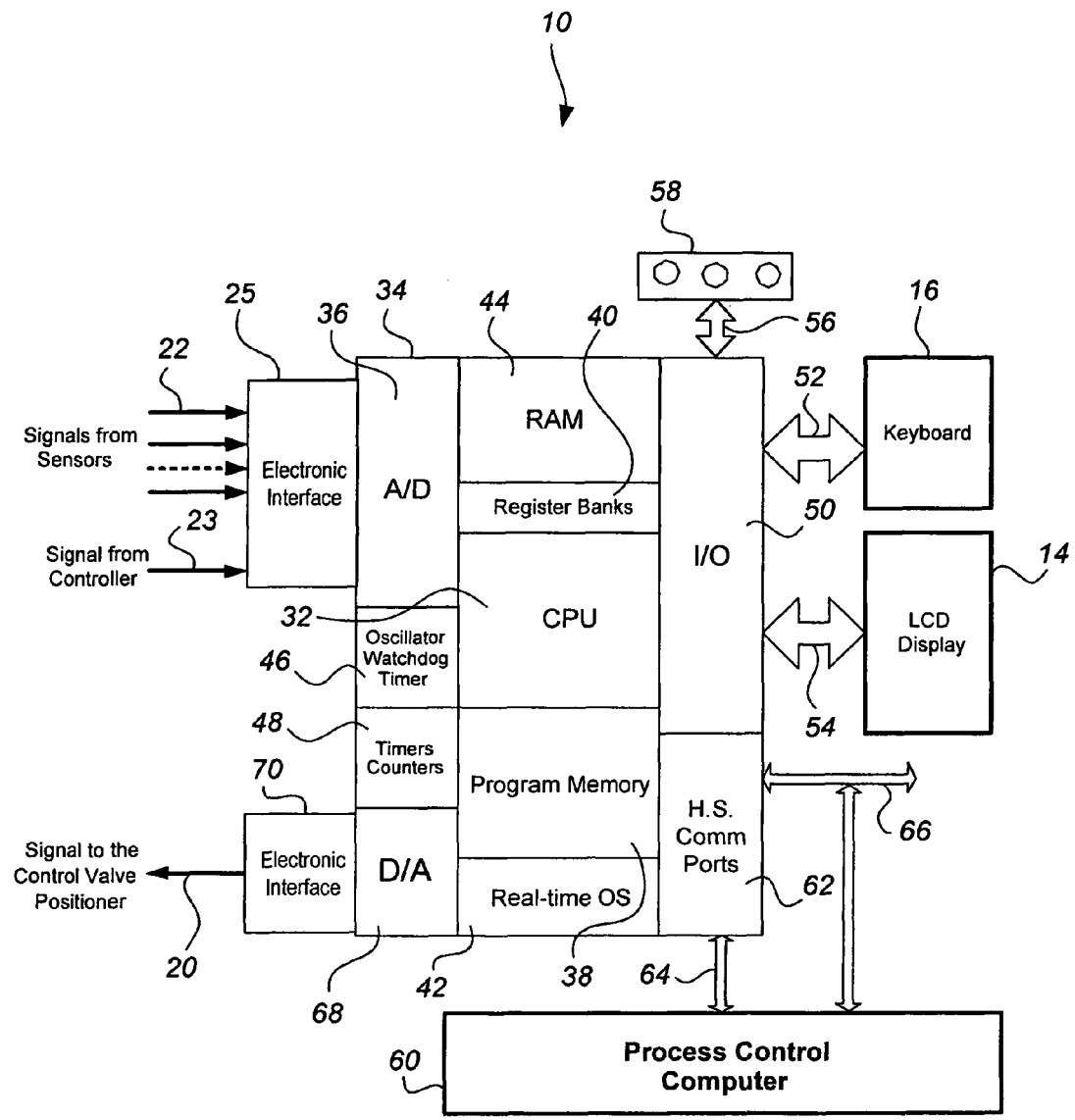
FIG. 3 is a block diagram of the device of FIG. 1.

As shown in the block diagram of FIG. 3, the input signals from sensors linked to flow conduits and the signal from the flow controller (input signals 22, 23, respectively, indicated by directional arrows) are received through electronic interface 25, which is in communication with central processing unit 32 (which may be a high performance microcontroller, programmable logic controller, a microprocessor, or other processing unit) mounted on apparatus control logic board 34, and further in communication with analog-to-digital converter 36. Although the number of inputs connected to the device is taken here to be four, it should be understood that four inputs have been selected for exemplary purposes only, and that the number of inputs depends upon the intended process application and the valve type. Similarly, the electronic control board 34 and the layout of the various electronic components thereon is shown for exemplary purposes only, and is intended to be exemplary only. It will also be understood that the blocks in FIG. 3 may represent discrete components in the case of a microprocessor, or may represent several components integrated into a single integrated circuit in the case of a microcontroller or programmable logic controller (e.g., a microcontroller with a microprocessor, ROM, RAM, A/D converter, D/A converter, serial communication unit, etc. integrated on a single chip).

Although the input and output signal forms are taken to be analog signals in the range of approximately 4 to 20 mA, it should be understood that other analog or digital input or output forms and methods may also be utilized. In particular, the device 10 may be adapted for interface with the field sensors and the valve positioner digitally, via an appropriate field bus.

In order to offload the process control computer 60, it is preferable to utilize a dedicated computing and signal processing unit in order to store and manipulate the sensors and the command signal in accordance with the method and procedure to be discussed below, with reference to FIG. 4.

In some embodiments, the central processing unit (CPU) 32 may be a high performance microcontroller with on-chip analog-to-digital and digital-to-analog units, and a serial communication unit for interfacing with the host computer. The CPU 32 receives instructions sequentially from the program memory 38 and executes them. The program memory 38 stores the detailed computational steps, outlined below in FIGS. 4 and 5. The results of execution may be stored temporarily in one or more banks of general purpose registers 40.

The operating system 42 manages the execution of various tasks, and allocates RAM memories 44, board resources, and CPU time according to the execution priorities of various tasks. The RAM memory 44 stores the various flow measurements, their scaled values, and their processed and transformed values. The RAM memory 44 may consist of two volatile and non-volatile parts. The non-volatile memory stores the configuration parameters and the setup parameters, the accumulated values, and the identified values. The volatile memory stores the current values, status values, and limited historical values for periodic reporting to a host computer, if needed.

The execution timing is determined by a master CPU clock oscillator 46, which includes a special watch-dog timer 46, which produces an alarm and initiates a special reset sequence if the CPU 32 halts for any reason. If the board malfunctions, the input signal 18 (the combination of sensor signals 22 and control signal 23) is automatically bypassed to the output 20. The timer/counter unit 48 contains a number of programmable digital counters, which can be programmed to provide time delays and timing sequences for sampling and for execution of other program fragments. The analog-to-digital converter 36 converts the signals present on the analog input channels to digital words at a specified sampling rate. The analog input channels are connected to the various sensors, as described above.

The CPU 32 is internally connected to a plurality of digital input/output registers 50, which interface with external devices via the digital input/output (I/O) channels 52, 54, and 56. The I/O digital channel 52 is connected to keyboard 16, which allows the operator to initialize operating parameters, configure the software for a particular flow characteristics, and for testing and maintenance purpose. The digital I/O channel 56 is used to drive a plurality of status/fault light emitting diode (LED) indicators 58. The digital I/O channels 54 interface the control board to liquid crystal display unit 14. The display unit 14 displays status parameters, the operating mode (online, maintenance, or engineering), values invoked by the operator, error messages, and the measured values.

In the online mode, the measured and calculated values are communicated at a regular rate to the process control computer 60 via the high speed ports 62, and the high speed communication links 64 and 66. Preferably, one of the communication links functions as the primary link, while the other acts as a backup link. The secondary communication link may further be used by maintenance crews and engineers during field testing and configuration of the unit. The high speed ports 62 implement one or more communication buses and protocols, which may include a field bus, a local area network, or a serial communication bus (such as RS 485, Modbus, or a USB port, for example). The digital-to-analog unit 68 converts the calculated digital values to an analog value, which are then filtered and converted to a proper output signal to the control valve positioner through terminal 20. An interface unit 70 is in communication with the digital-to-analog converter 68 for converting and transmitting the output signal to the control valve positioner.

Figure 2:
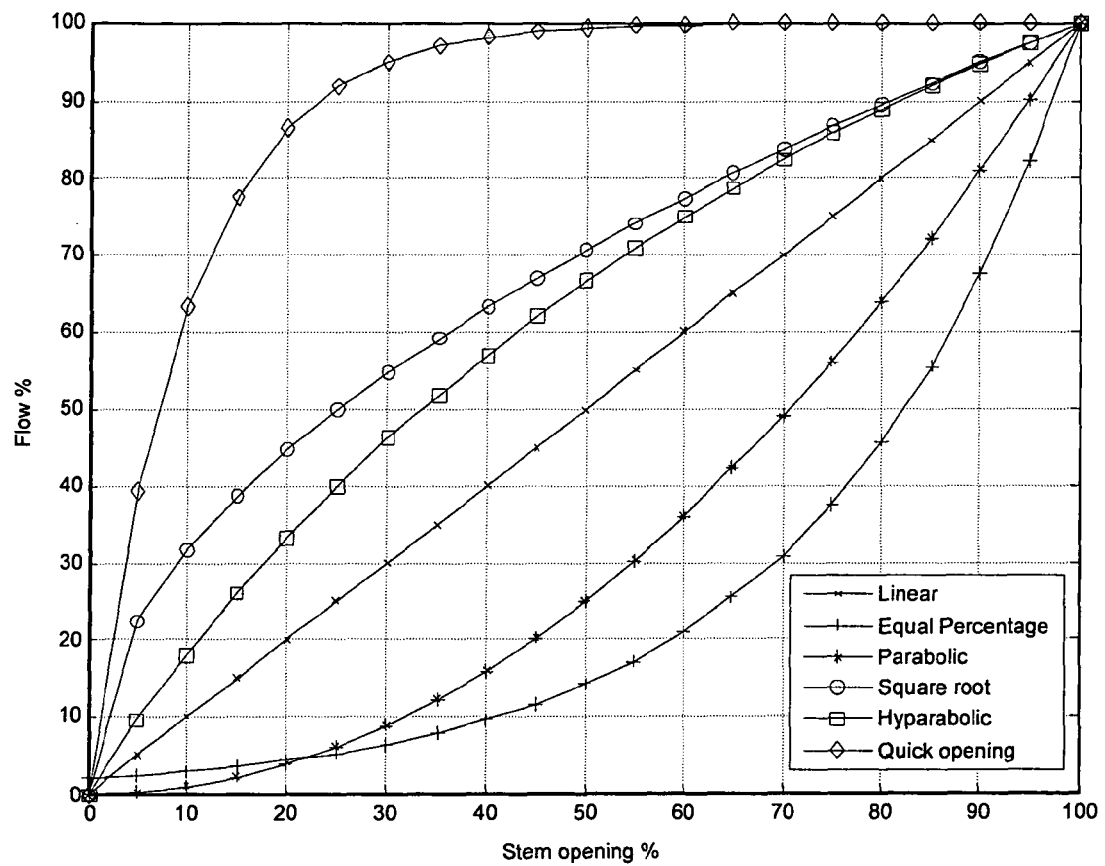
FIG. 2 is a data plot illustrating control valve characteristics for an exemplary valve regulated by the system and method for controlling flow characteristics according to the present invention, shown as flow percentages plotted against stem opening percentages.
Figure 4:
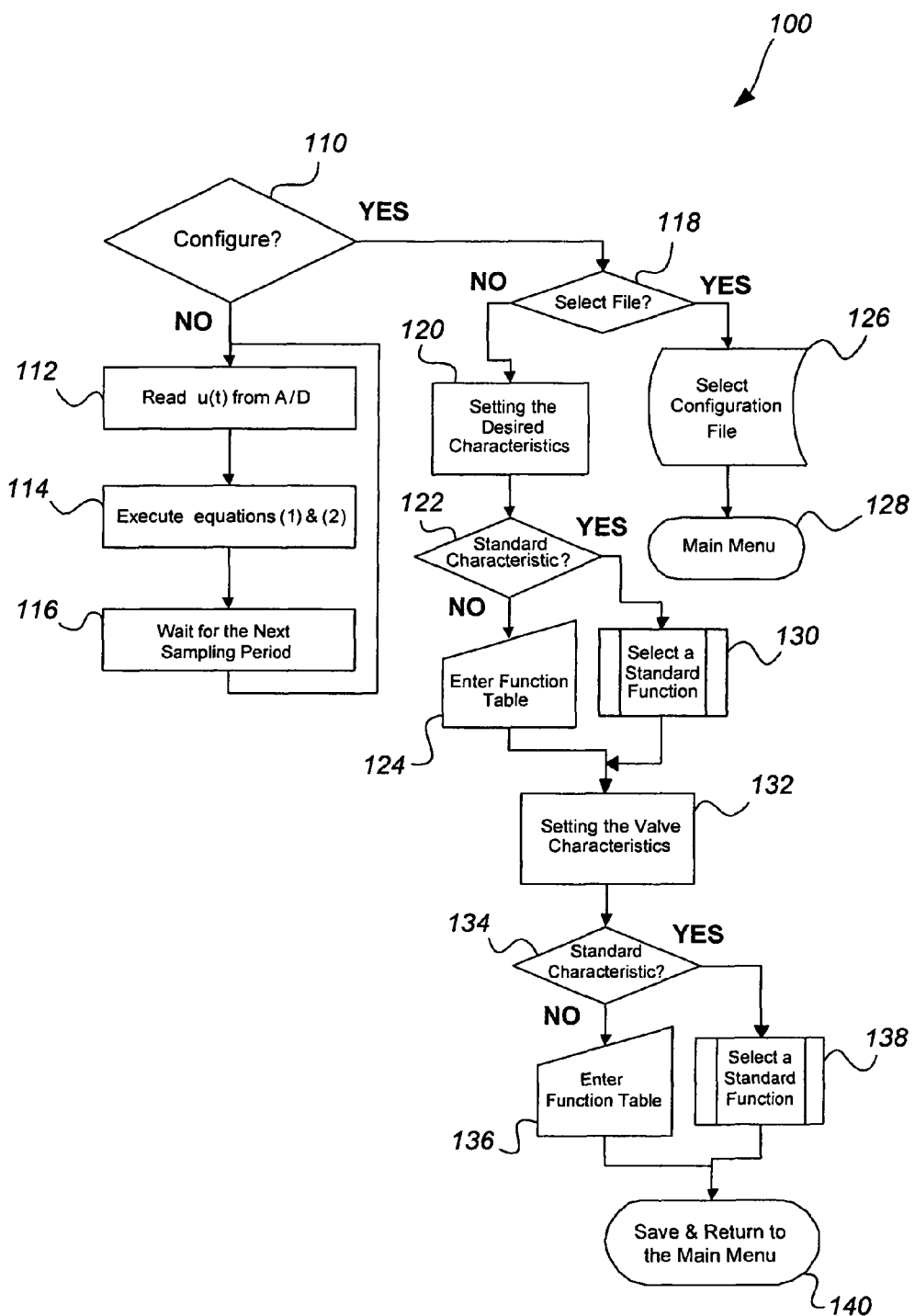
FIG. 4 is a flowchart of the steps in a method for controlling flow characteristics according to the present invention in a first mode of operation.
Figure 5:
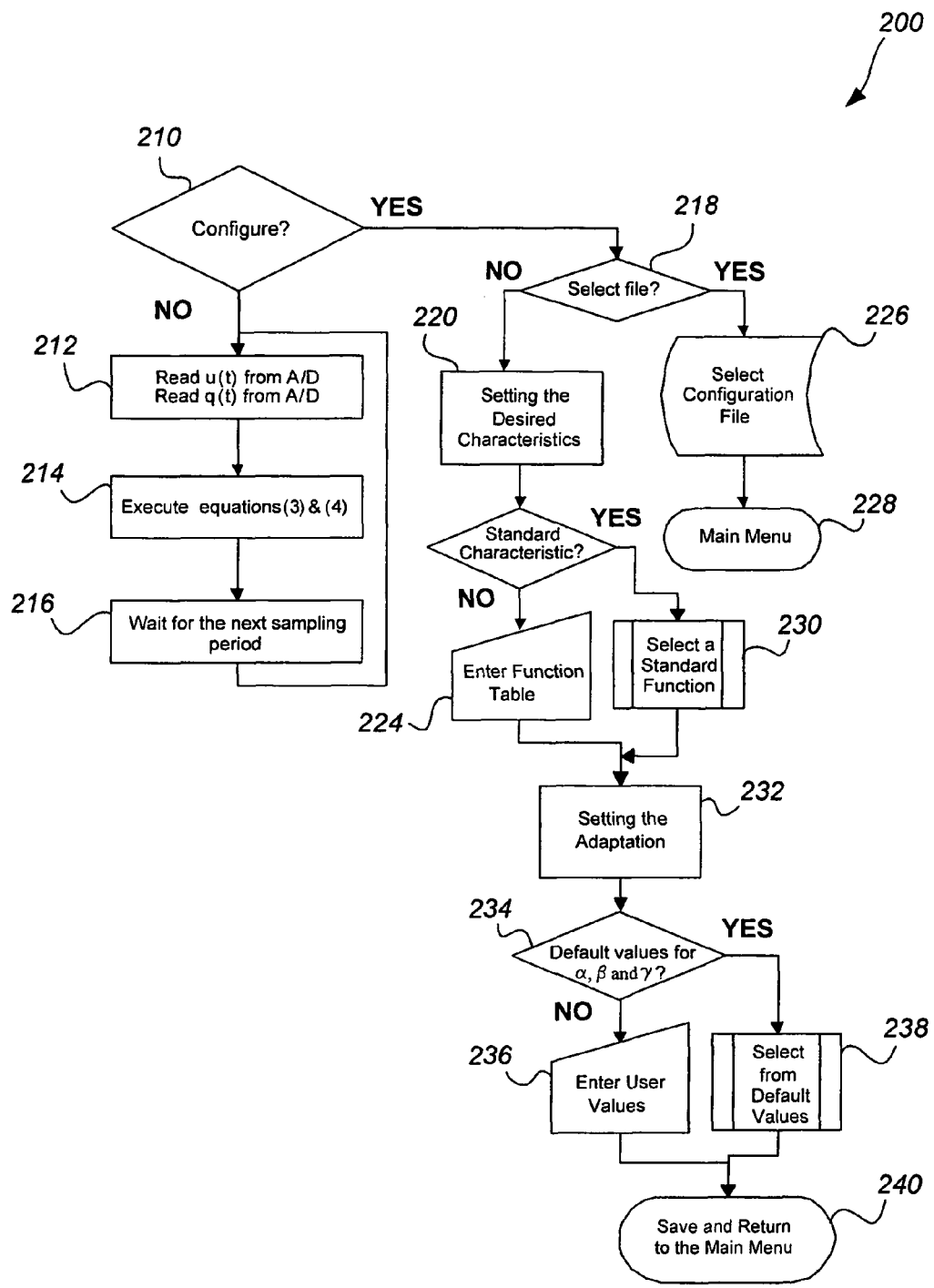
FIG. 5 is a flowchart of the steps in a method for controlling flow characteristics according to the present invention in a second mode of operation.

The method of modifying the flow characteristics is shown in FIGS. 4 and 5. The execution of all steps is typically repeated at each sampling period. The sampling rate may be determined by the user, although the sampling rate should, preferably, be at least three times the time constant of the control valve. Typically, this would be in the range of between approximately ten and twenty samples per second. FIG. 2 illustrates examples of valve flow characteristics following the equations below, where f is the percent flow rate, and u is the percent stem position:

Linear: $f(u) = u$

Parabolic: $f(u) = 100\left(\frac{u}{100}\right)^2$

Hyperbolic: $f(u) = 200 - \left(\frac{200}{1+(u/100)}\right)$

Square Root: $f(u) = 100\sqrt{\left(\frac{u}{100}\right)}$

Quick Opening: $f(u) = 100(1 - e^{-u/10})$

Equal percentage: $f(u) = f_{min} e^{-Lin(f_{min}/100)\frac{u}{100}}$, where $f_{min}$ is the minimum percent flow rate.

The above functions and their inverses are samples of possible standard functions that are stored in the firmware of system 10.

A first operational mode 100 is illustrated in FIG. 4. In this mode, the only input signal is the control signal coming from the process control unit. During configuration (step 110), the operator enters the type of flow characteristic of the valve (i.e., the inherent flow characteristics of the valve) and the type of the desired flow characteristics. The operator can save the configuration for later retrieval and editing. Both the desired and the inherent valve characteristics can be chosen from the stored standard list (saved in permanent memory) or entered as a table of points on a curve. Using tables allows the user to enter the valve flow characteristics based on calibration data, and to further enter arbitrary desired flow characteristics in order to compensate for process nonlinearities. The operator further enters the maximum differential pressure and the operating differential pressure, as well as the maximum and minimum flow. A correction factor is then calculated to convert the inherent characteristics to values that are close to the desired valve flow characteristics.

In order to perform the necessary calculations, $f(\bullet)$ is defined as the set of inherent characteristics of the connected valve, $f_{inv}(\bullet)$ is defined as the inverse function of $f(\bullet)$ $D(\bullet)$ is a desired valve inherent flow characteristic, u(t) is defined as the normalized control command from the process control system, and û(t) is defined as the modified and normalized control output to the control valve positioner. Then, the following equation definitions are established:

$$x(t)=D(u(t)) \quad (1)$$

$$û(t)=f_{inv}(x(t)) \quad (2)$$

The value of û(t) is then scaled and converted to an appropriate signal level or a digital format and sent to the control valve positioner. In the above, if the user chooses not to configure at step 110, then u(t) is read from the analog-to-digital converter 34 (step 112), and x(t) and û(t) are calculated at step 114. The process is then repeated for each sampling period (step 116).

However, if the user chooses to configure at step 110, then the user, as noted above, may also choose to store or re-enter saved configuration data (step 118). If the user stores the configuration data, the user is then offered a choice of configuration files to store the data within (step 126), and may be returned to the controller main menu (step 128), which is displayed to the user on display 14. At step 126, the user may also input previously saved configuration data from a selected file. The user's input is done at this step, and the user simply returns to the main menu. If the user is inputting new data (which may be stored via step 118, but does not necessarily have to be), the desired flow characteristics are input at step 120.

The user is provided with a menu of standard functions (at step 130) or may enter data in the form of a table or the like (as described above) at step 124 (with the decision being made at step 122). From the flow characteristics, the user may either input desired valve characteristics 132, or the desired valve characteristics may be computed automatically based upon the input desired flow characteristics. If the characteristics of the valve are standard, the user may select the standard functions stored in memory at step 138, or may enter the data in the form of a table or the like at step 136 (with the decision being made at step 134). The desired data for both flow and valve position is then saved at step 140 and the user may be returned to the main menu.

Any of the functions shown in FIG. 2 could be one of the standard built-in functions, or entered in the form of a table, as described above. For a tabled function, the mapping is executed using standard Spline interpolation techniques.

A second mode of operation 200 is shown in FIG. 5. Mode 200 is implemented when the flow measurements are available from a flow transmitter. In this mode, the user needs only to select or enter the desired flow characteristics. The configuration sequence is similar to that of mode 100, described above. The system utilizes a specialized dynamic feedback equation to automatically set the flow characteristics according to the desired curve. For this automatic calculation, q(t) is defined as the normalized value of the flow measurement at time t. The method calculating the modified control output is as follows:

$$E(t)=u(t)-D_{inv}(q(t)) \tag{3}$$

$$\hat{u}(t)=\hat{u}(t-1)+\alpha E(t)+\beta E(t-1)+\gamma E(t-2), \tag{4}$$

where $\alpha$, $\beta$, and $\gamma$ are the loop parameters. The default values are $\alpha=1$; $\beta=\gamma=0$, although other values may be tuned experimentally for the best performance of the system.

Mode 200 will provide an apparent inherent valve characteristics $q(t)=D(u(t))$ irrespective of the actual inherent valve characteristics, and compensates for the distortion effect of the variation of the pressure across the valve. In the above, if the user chooses not to configure at step 210, then u(t) and q(t) are read from the analog-to-digital converter 34 (step 212), and E(t) and $\hat{u}(t)$ are calculated at step 214. The process is then repeated for each sampling period (step 216).

However, if the user chooses to configure at step 210, then the user, as noted above, may also choose to store or re-enter saved configuration data (step 218). If the user stores the configuration data, the user is then offered a choice of configuration files to store the data within (step 226), and may be returned to the controller main menu (step 228), which is displayed to the user on display 14. At step 226, the user may also input previously saved configuration data from a selected file. The user's input is done at this step, and the user simply returns to the main menu. If the user is inputting new data (which may be stored via step 218, but does not necessarily have to be), the desired flow characteristics are input at step 220.

The user is provided with a menu of standard functions (at step 230) or may enter data in the form of a table or the like (as described above) at step 224 (with the decision being made at step 222). From the flow characteristics, the user may either input desired, adapted valve characteristics 232, or the desired, adapted valve characteristics may be computed automatically, based upon the input desired flow characteristics. If the characteristics of the valve are standard, the user may select the default values stored in memory at step 238, or may enter the data in the form of a table or the like at step 236 (with the decision being made at step 234). The desired data for both flow and valve position is then saved at step 240 and the user may be returned to the main menu.

Any of the functions shown in FIG. 2 could be one of the standard built-in functions, or entered in the form of a table, as described above. For a tabled function, the mapping is executed using standard. Spline interpolation techniques.

Alternatively, in a third mode of operation, it is assumed that the measurement of the differential pressure across the valve is available from an appropriate sensor (in the case of liquid), or from the knowledge of the upstream and downstream fluid pressure (in the case of gas). This mode of operation uses expert decisions to advise the operator regarding the suitable flow characteristics, or, if enabled, will automatically select the best desired flow characteristics based on the operating conditions.

The proper selection of a control valve involves matching the valve characteristics to the characteristics of the process. When this is completed, the control valve contributes to the stability of the control system. Matching the valve characteristics to a particular system requires a complete dynamic analysis of the system. When a complete dynamic analysis is not justified, expert decision rules are included for automatic selection of the flow characteristics and for adaptation of the valve behavior, or for advising the operator as to the best characteristics to be used as per the measured operating conditions.

In this mode, the system monitors the upper and lower ranges of the differential pressure and identifies these ranges. The knowledge of these estimated values, the rated values of the valve, and the process type are used to select and automatically set the desired flow characteristics. The equations and algorithm used in this mode are as follows:

$$DP_{min}(t)=\mu DP_{min}(t-1); DP_{max}(t)=\mu DP_{max}(t-1) \tag{5}$$

$$\text{If } DP(t)<DP_{min}(t-1) \text{ then } DP_{min}(t)=DP(t); q_1=q(t) \tag{6}$$

$$\text{If } DP(t)>DP_{max}(t-1) \text{ then } DP_{max}(t)=DP(t); q_2=q(t) \tag{7}$$

$$q_{min}(t)=\mu q_{min}(t-1)$$

$$q_{max}(t)=\mu q_{max}(t-1) \tag{8}$$

$$\text{If } q(t)<q_{min}(t-1) \text{ then } q_{min}(t)=q(t); dp_1=DP(t) \tag{9}$$

$$\text{If } q(t)>q_{max}(t-1) \text{ then } q_{max}(t)=q(t); dp_2=DP(t) \tag{10}$$

The default value of $\mu$ is 0.99 in this embodiment. Other values can be chosen through experimental data.

The flow processes are as follows:

$$\text{If } (q_{max}(t)-q_{min}(t))>\sigma_1 Q_{MAX} \text{ then use linear flow characteristics,} \tag{11}$$

where $\sigma_1=0.6$ in this case.

$$\text{If } ((q_{max}(t)-q_{min}(t))<\sigma_2 Q_{MAX} \text{ and } (DP_{max}(t)-DP_{min}(t))>\sigma_3 DP_{MAX}; \text{ then use equal percentage flow characteristics,} \tag{12}$$

where $\sigma_2=0.25$ and $\sigma_3=0.3$ in this case.

Equal percentage characteristics are usually specified if less than half of the system pressure drop is across the control valve. If most of the system pressure drop is across the valve, a linear characteristic may be preferred.

$$\text{If } (DP_{max}(t)+DP_{min}(t))/2<0.5\Delta P_{MAX}; \text{ then use equal percentage flow characteristics.} \tag{13}$$

$$\text{If } (DP_{max}(t)+DP_{min}(t))/2<\sigma_4 DP_{MAX}; \text{ then use linear flow characteristics,} \tag{14}$$

where $\sigma_4=0.8$ in this case.

For liquid level processes:

$$\text{If } (DP_{max}(t)-DP_{min}(t))<\sigma_5(DP_{max}(t)+DP_{min}(t))/2; \text{ then use linear flow characteristics,} \tag{15}$$

where $\sigma_5=0.1$ in this case.

$$\text{If } ((dp_2-dp_1)(q_2-q_1)<0 \text{ and } (DP_{max}(t)>\sigma_6 DP_{MAX}; \text{ then use linear flow characteristics,} \tag{16}$$

where $\sigma_6=0.2$ in this case.

$$\text{If } ((dp_2-dp_1)(q_2-q_1)<0 \text{ AND } (DP_{max}(t)<\sigma_7 DP_{MAx}; \text{ then use equal percentage flow characteristics,} \tag{17}$$

where $\sigma_7=0.2$ in this case.

$$\text{If } ((dp_2-dp_1)(q_2-q_1)>0 \text{ and } (DP_{max}(t)<\sigma_8 DP_{min}); \text{ then use linear flow characteristics,} \tag{18}$$

where $\sigma_8=2$ in this case.

$$\text{If } ((dp_2-dp_1)(q_2-q_1)>0 \text{ and } (DP_{max}(t)>\sigma_8 DP_{min}); \text{ then use quick opening flow characteristics.} \tag{19}$$

Equal percentage characteristics are usually specified if less than half of the system pressure drop is across the control valve. If most of the system pressure drop is across the valve, a linear characteristic may be preferred.

$$\text{If } ((dp_2-dp_1)(q_2-q_1)<0 \text{ and } (DP_{max}(t)+DP_{min}(t))/2<0.5\Delta P_{MAX}; \text{ then use equal percentage flow characteristics.} \quad (20)$$

$$\text{If } ((dp_2-dp_1)(q_2-q_1)<0 \text{ and } (DP_{max}(t)+DP_{min}(t))/2<\sigma_4 DP_{MAX}; \text{ then use linear flow characteristics.} \quad (21)$$

In a fourth mode of operation, additional measurements from the control valve, such as the valve stem position, are further considered. This mode is particularly useful for automatic identification of the valve flow characteristics, detection of valve stiction, and compensation of small valve stiction. This mode is further useful when the apparatus is to be integrated with a valve positioner system and/or a local flow control loop. The fourth mode is further utilized when the measurement of the valve stem position is available, and when the valve has some stiction/hysteresis nonlinearities. The compensation is performed by two nested measurement-correction loops, as follows:

$$E(t)=u(t)-D_{inv}(q(t)) \quad (22)$$

$$u_1(t)=u_1(t-1)+\alpha E(t)+\beta E(t-1)+\gamma E(t-2), \quad (23)$$

where α, β, and γ are the loop parameters, and $$\hat{u}(t)=f_{inv}(u_1(t))-\lambda(d(t)-d(t-1))+v(t) \quad (24)$$

The actual valve stem position may also be used to monitor the amount of stiction and produce an alarm or warning if the stiction is excessively distorted from the desired flow characteristics. The second term in equation (24) corrects for the fast movement of the stem when the actuator force of the valve breaks the static friction. The last term is a uniformly distributed random sequence with mean zero, with $\max|v(t)|=\sigma_9\Delta\hat{u}/100$, where $\Delta\hat{u}$ is the percent of stiction.

It is to be understood that the present invention is not limited to the embodiments described above, but encompasses any and all embodiments within the scope of the following claims.

We claim:

1. A method for controlling fluid flow characteristics, comprising the steps of:
   providing a programmable flow controller;
   positioning the programmable flow controller between a flow process controller and a control valve positioner;
   programming desired user-selectable flow characteristics into the programmable flow controller, the programming of the desired user-selectable flow characteristics including a selected flow curve ƒ(u), wherein ƒ(u) represents a percentage flow rate and u represents a percentage of valve stem position controlled by said control valve positioner;
   storing the user-selectable flow characteristics in computer memory;
   inputting a set of inherent valve parameters into the programmable flow controller;
   calculating a set of desired valve parameters from the user-selectable flow characteristics;
   comparing the set of inherent valve parameters to the set of desired valve parameters to determine a difference;
   calculating a correction factor according to the difference between the set of inherent valve parameters and the set of desired valve parameters;
   correcting a control signal from the flow process controller according to the correction factor to form a modified control signal; and
   transmitting the modified control signal to the control valve positioner.

2. The method for controlling fluid flow characteristics as recited in claim 1, wherein said step of programming the desired user-selectable flow characteristics includes manually entering the desired user-selectable flow characteristics into the programmable flow controller.

3. The method for controlling fluid flow characteristics as recited in claim 1, wherein said step of programming the desired user-selectable flow characteristics includes importing a table of previously stored desired user-selectable flow characteristics into the programmable flow controller.

4. The method for controlling fluid flow characteristics as recited in claim 1, further comprising the step of inputting a set of desired valve characteristics, wherein the step of calculating the set of desired valve parameters is based upon the user-selectable flow characteristics and is further based upon desired valve characteristics.

5. The method for controlling fluid flow characteristics as recited in claim 4, wherein the step of inputting a set of desired valve characteristics includes manually inputting the set of desired valve characteristics into the programmable flow controller.

6. The method for controlling fluid flow characteristics as recited in claim 4, wherein the step of inputting a set of desired valve characteristics includes importing a previously saved set of desired valve characteristics into the programmable flow controller.

7. The method for controlling fluid flow characteristics as recited in claim 1, wherein said step of programming desired user-selectable flow characteristics into the programmable flow controller includes selection of a desired flow curve ƒ(u) from the group consisting of: a linear curve, a parabolic curve, a hyperbolic curve, a square-root curve, a quick opening curve and an equal percentage curve.

* * * * *